United States Patent [19]

Schmidt

[11] 4,093,179

[45] June 6, 1978

[54] POWER WRENCH

[76] Inventor: Charles F. Schmidt, P.O. Box 126, Junction City, Kans. 66441

[21] Appl. No.: 755,677

[22] Filed: Dec. 30, 1976

[51] Int. Cl.² .................... F16K 31/04; F16L 55/10
[52] U.S. Cl. ................................ 251/133; 251/291; 251/145; 251/351
[58] Field of Search ............ 251/340, 291, 145, 133, 251/292, 346, 351

[56] References Cited

U.S. PATENT DOCUMENTS

| | | | |
|---|---|---|---|
| 1,652,929 | 12/1927 | Cawdod | 251/351 X |
| 2,596,532 | 5/1952 | Coolidge et al. | 251/291 X |
| 3,033,514 | 5/1962 | Grosch | 251/145 |
| 3,103,341 | 9/1963 | Moran | 251/351 X |
| 3,863,888 | 2/1975 | Hines | 251/133 X |

*Primary Examiner*—Arnold Rosenthal
*Attorney, Agent, or Firm*—Fishburn, Gold & Litman

[57] ABSTRACT

A power wrench opens and closes a gate valve on irrigation water pipe thereby controlling water flow from the pipe into desired areas for irrigation of crops. The power wrench includes a tubular flow member which defines a flow passage extending through a second gear and through a gripping member mounted on the second gear and engageable with the gate valve whereby water flowing from the open valve will flow through the gripping member and tubular flow member. The power wrench is power operated and includes a drive motor operative to rotate a first gear and thereby turn a second gear in engagement therewith.

7 Claims, 5 Drawing Figures

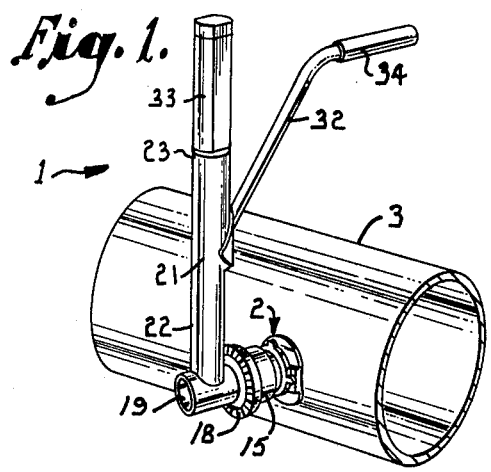
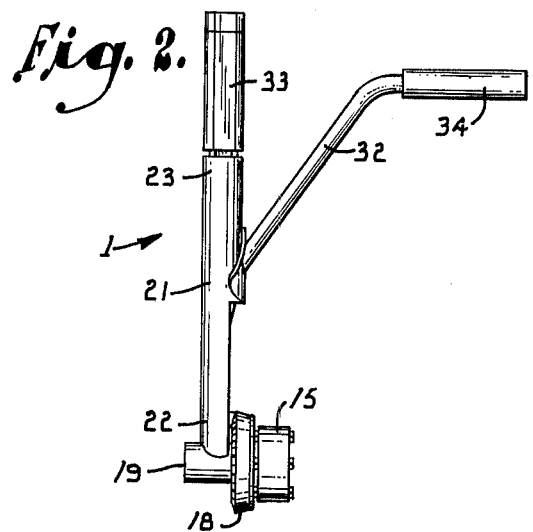
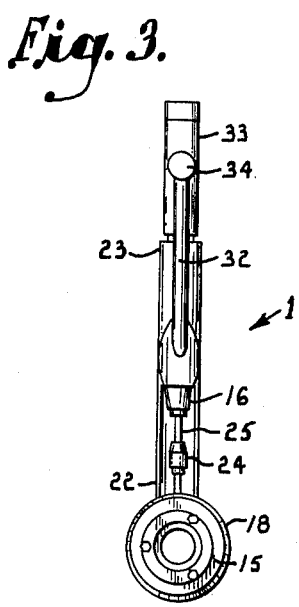
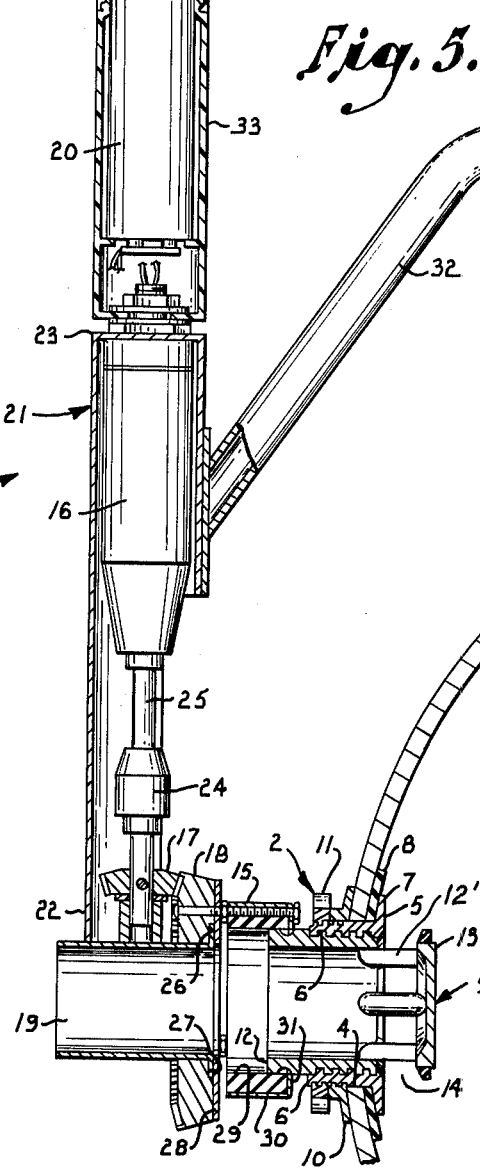
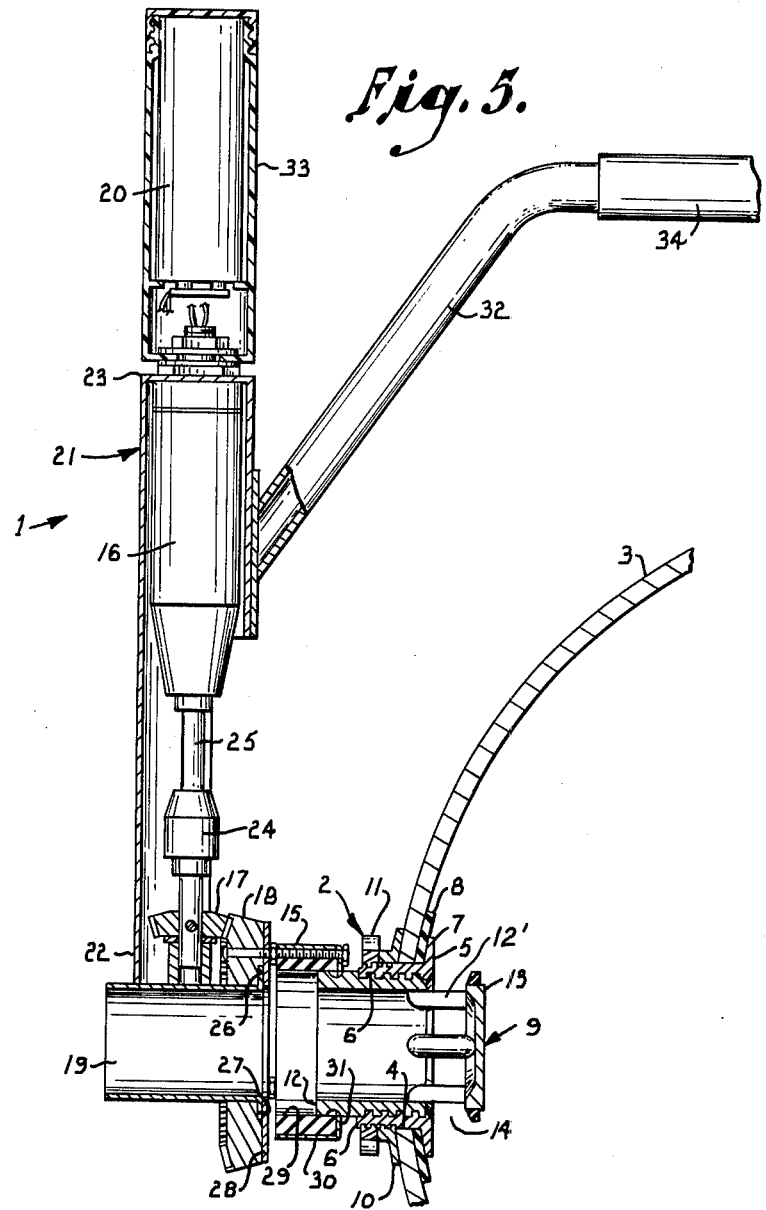

POWER WRENCH

The present invention relates to power wrenches and more particularly to a power wrench having a gripping member engageable with a gate valve on irrigation water pipe and arranged so that water may flow from a gate valve during opening and closing of said valve by a power wrench.

The principal objects of the present invention are: to provide a power wrench particularly adapted for opening and closing a gate valve on irrigation water pipe and permitting flow of water from the pipe during opening and closing operation of the valve; to provide such a power wrench having a flow passage through an end portion thereof and alignable with a flow passage through the gate valve on the irrigation pipe with an absence of interference with the water flow; to provide such a power wrench having a gripping member adapted to surround and resiliently grip a movable portion of the gate valve for turning same during opening and closing thereof; to provide such a power wrench wherein one handle is movable to selectively energize a drive motor operative to turn the gripping member; and to provide such a power wrench which is economical to manufacture, durable in construction, positive in operation and particularly well adapted for the proposed use.

Other objects and advantages of this invention will become aparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the power wrench.

FIG. 1 is a perspective view of a power wrench embodying features of the present invention and shown on a gate valve of an irrigation pipe.

FIG. 2 is a side elevational view of the power wrench.

FIG. 3 is a bottom plan view of the power wrench.

FIG. 4 is a top plan view of the power wrench.

FIG. 5 is an enlarged longitudinal sectional view through the power wrench and through the gate valve on the irrigation water pipe.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a power wrench for opening and closing a gate valve 2 on irrigation water pipe 3 thereby controlling water flow from the water pipe 3. The wrench 1 is constructed to operate the valve 2 and permit flow of water during opening and closing of the valve 2.

The wrench 1 is particularly adapted to operate an irrigation gate valve 2 such as illustrated in FIGS. 1 and 5. In the structure shown, the pipe 3 has an opening 4 having the gate valve 2 mounted therein. A suitable bushing 5 has a tubular portion 6 thereof positioned in the opening 4 in the irrigation water pipe 3. The bushing 5 includes an end flange 7 positioned within the water pipe 3. A suitable resilient gasket 8 is positioned between the bushing end flange 7 and an interior surface of the water pipe 3 and thereby seals the bushing 5 in the pipe opening 4 when secured thereto as hereinafter described.

The tubular portion 6 of the bushing 5 extends outwardly of the water pipe and provides a guide for a valve member 9. The bushing tubular portion 6 is threaded on an exterior and interior surface thereof. A suitable saddle 10 is sleeved on the exterior surface of bushing tubular portion and is engageable with the exterior surface of the water pipe 3. A fastening member or nut 11 is threadedly mounted on the exterior surface of the bushing tubular portion 6 and is operative to effect clamping of the gasket 8 between the bushing end flange 7 and the water pipe interior surface. The nut 11 also effects clamping of the saddle 10 between the nut 11 and the water pipe exterior surface.

The valve member 9 has a tubular flow or discharge portion 12 having an exterior surface thereof threaded and engaged in the threaded interior surface of bushing tubular portion 6. The valve member 9 has an end flange 13 positioned within the water pipe 3 and movable into and out of seating engagement with the bushing end flange 7. The portion of the valve member tubular portion 12 adjacent the valve member end flange 13 has a plurality of spaced legs 12' connecting the tubular portion 12 to the flange 13 and providing a plurality of flow apertures 14 therebetween permitting flow of water therethrough and into the valve member tubular portion 12 when the valve member end flange 13 is unseated with the bushing end flange 7.

The power wrench 1 preferably is power operated and has a speed reduction mechanism to rotate a gate valve gripping member 15 to selectively rotate same in forward or reverse direction. In the illustrated structure, the drive includes a drive motor 16 operative to rotate a first gear 17 and thereby turn a second gear 18 in engagement therewith. A tubular flow member 19 defines a flow passage extending through the second gear 18 and through the gripping member 15 mounted on the second gear 18 and engageable with the gate valve 2 whereby water flowing from the open gate valve 2 will flow through the gripping member 15 and through the tubular flow member 19.

The power wrench 1 is preferably portable, therefore, the drive motor 16 and power means, such as a battery 20, are positioned within a housing 21 which has a first end portion 22 with the tubular flow member 19 mounted thereon. The housing 21 includes a second or other end portion 23 enclosing the drive motor 16 and the battery 20 therein.

The first end portion 22 defines a cover and a support for the first gear 17. In the illustrated embodiment, the drive motor 16 has a suitable chuck 24 thereon which is adapted to receive and retain therein one end portion of an elongated shaft 25 having the other end portion thereof rotatably supported on or adjacent the tubular flow member 19, as in a suitable bearing mounted on the tubular flow member 19. The first gear 17 is mounted on the elongated shaft 25 and positioned adjacent to the tubular flow member 19. The housing first end portion 22 may be any desired shape which provides a connection between the housing second end portion 23 and the tubular flow member 19 and thereby support for the first gear 17. The illustrated housing first end portion 22 is arcuate in cross section and defines a portion of a cylinder.

The second gear 18 is mounted on and surrounds one end portion of the tubular flow member 19. A flange 26 is formed on one end portion of the tubular flow member 19 and is received in an annular recess 27 in one face of the second gear 18. The illustrated second gear 18 is an annular member having the tubular flow member 19 extending therethrough and having a ring of gear teeth on the face opposite the recess 27 and engaged with the gear teeth on the first gear 17.

The tubular flow member flange 26 is retained in the recess 27 by a planar cover member 28 which is suitably mounted on the face of the second gear 18 having the recess 27 therein. The cover member 28 has an aperture therein aligned with the flow passage through the tubular flow member 19.

The gripping member 15 is illustrated as an annular member having a bore or passage therethrough aligned with the flow passage through the tubular flow member 19. The gripping member 15 is mounted on the second gear 18 and rotatable therewith. The gripping member 15 is engageable with an exterior surface of tubular portion 12 of the gate valve member 9 and the bore or passage through the gripping member 15 is aligned with the flow passage through the flow member 19.

The gripping member 15 includes a liner member 29 engageable with the exterior surface of the tubular portion 12 of the gate valve member 9. The liner member 29 is formed of resilient material, such as rubber. In the illustrated embodiment, the gripping member 15 includes a side wall 30 surrounding the liner member 29 and having an end flange 31 arranged in covering relation with one end of the liner member 29 to thereby retain the liner member 29 between the end flange 31 and the cover member 28 on the second gear 18.

First and second handles 32 and 33 are mounted on the housing 21 and extend therefrom to aid an operator of the power wrench 1 in positioning same during opening and closing the gate valve 2 on the irrigation water pipe 3. In the illustrated embodiment, one of the handles, for example the first handle 32, extends from the side of the second end portion 23 of the housing 21. The first handle 32 is positioned to define an acute angle between the first handle 32 and the side of the housing second end portion 23. The first handle 32 has an end portion 34 positioned substantially parallel with the tubular flow member 19.

The other of the handles, for example the second handle 33, is longitudinally aligned with the housing second end portion 23 and the second handle 33 is rotatably mounted on the opposite or second end portion 23 of the housing 21 and movable between forward, neutral, and reverse positions. The drive motor 16 is reversible and turning of the second handle 33 in a first or forward direction is operative to complete a circuit electrically connected to the drive motor 16 and effective to turn the drive motor 16 in a first direction thereby turning the second gear 18 and the gripping member 15 in a first direction, as for opening the gate valve 2. Turning the second handle 33 in a second or reverse direction is operative to complete a circuit electrically connected to the drive motor 16 and effective to turn the drive motor 16 in a second direction thereby turning the second gear 18 and the gripping member 15 in a second direction, as for closing the gate valve 2.

In using the power wrench 1 for opening or closing the gate valve 2, the power wrench 1 is maneuvered by the handles 32 and 33 so that the liner member 29 within the gripping member 15 is surrounding and in engagement with the exterior surface of the tubular portion 12 of the gate valve member 9. The second handle 33 is turned or rotated in a first or second direction from a neutral position as desired to turn the second gear 18 in a desired direction by means of the power motor 16, elongated shaft 25, and first gear 17. The rotation of the second gear 17 and the gripping member 15 is operative to move the end flange 13 on the tubular portion 12 of the valve member 9 into or out of seating engagement with a suitable seat on the gate valve 2. The portion of the gate valve tubular portion 12 adjacent the end flange 13 thereof has the plurality of spaced legs 12' and the flow apertures 14 therebetween permitting flow of water therethrough and into the tubular portion 12 when the end flange 13 is not in setted position. The water flows through the tubular portion 12 and into the gripping member 15 and through the tubular flow member 19. The gripping member 15 and tubular flow member 19 may be moved through a stream of water flowing from the tubular portion 12 and into a position with the gripping member 15 surrounding and in engagement with the exterior surface of the gate valve tubular portion 12 so that the gate valve 2 may be closed.

It is to be understood that while I have illustrated and described one form of my invention, it is not to be limited to the specific form or arrangement of parts herein described and shown.

What I claim and desire to secure by Letters Credit is:

1. A power wrench for operating gate valves on irrigation water pipe, said gate valve including a tubular discharge portion on the valve and extending outwardly of said pipe, said wrench comprising:
   (a) a gripping member having a bore with an interior surface for separably and frictionally engaging a tubular discharge member, said bore forming a flow passage therethrough aligned with the tubular discharge member;
   (b) power means for imparting reversible rotary motion; and
   (c) speed reduction means operatively connecting said power means with said gripping member for selectively rotating same for opening and closing the gate valve and permitting unobstructed water flow therethrough during opening and closing movement thereof.

2. A power wrench for operating gate valves on irrigation water pipe, said gate valve including a tubular discharge portion on the valve and extending outwardly of said pipe, said wrench comprising:
   (a) a gripping member for engaging a tubular discharge member of a gate valve for rotation thereof, said gripping member having a flow passage therethrough aligned with the tubular discharge member;
   (b) power means for imparting reversible rotary motion;
   (c) speed reduction means operatively connecting said power means with said gripping member for selectively rotating same for opening and closing the gate valve and permitting unobstructed water flow therethrough during opening and closing movement thereof; and
   (d) said gripping member including a liner member formed of resilient material.

3. A power wrench as set forth in claim 2 wherein:

(a) a housing supporting said power means and said speed reduction means; and (b) said housing includes means defining a flow passage longitudinally aligned with the flow passage through said gripping member.

4. A power wrench for operating gate valves on irrigation water pipe, said gate valve including a tubular discharge portion on the valve and extending outwardly of said pipe, said wrench comprising:

(a) a gripping member for engaging a tubular discharge member of a gate valve for rotation thereof, said gripping member having a flow passage therethrough aligned with the tubular discharge member;

(b) power means for imparting reversible rotary motion;

(c) speed reduction means operatively connecting said power means with said gripping member for selectively rotating same for opening and closing the gate valve and permitting unobstructed water flow therethrough during opening and closing movement thereof; said speed reduction means including:

(1) an elongated shaft rotated by said power means and having a first gear on an end portion thereof;

(2) a second gear rotatably supported on said housing and driven by said first gear, said second gear having said gripping member mounted thereon, said second gear having a bore therethrough longitudinally aligned with said housing flow passage and with said gripping member flow passage;

(d) said housing including one end portion supporting said elongated shaft and said first gear;

(e) said housing including an opposite end portion supporting said power means;

(f) first and second handles mounted on the opposite end portion of said housing and extending therefrom; and (g) one of said handles being rotatably mounted on the opposite end portion of said housing and including means therein for selectively energizing said power means upon turning of said one handle.

5. A power wrench for operating gate valves on irrigation water pipe, said gate valve including a tubular discharge portion on the valve and extending outwardly of said pipe, said wrench comprising:

(a) a gripping member for engaging a tubular discharge member of a gate valve for rotation thereof, said gripping member having a flow passage therethrough aligned with the tubular discharge member;

(b) power means including a drive motor for imparting reversible rotary motion;

(c) gear means operatively connecting said drive motor and said gripping member for selectively rotating same for opening and closing the gate valve and permitting unobstructed water flow therethrough during opening and closing thereof;

(d) a housing supporting said power means and said gear means;

(e) means on said housing defining a flow passage longitudinally aligned with said gripping member flow passage;

(f) said gripping member including a liner member formed of resilient material, said liner member being an annular member having an interior surface defining said flow passage through said gripping member.

6. A power wrench as set forth in claim 5 wherein:

(a) said drive motor includes an elongated shaft extending therefrom and rotated by said drive motor; and (b) said gear means includes:

(1) a first gear mounted on said elongated shaft and rotated with said elongated shaft; and (2) a second gear rotatably supported on said housing and driven by said first gear, said second gear having said gripping member mounted thereon, said second gear having a bore therethrough longitudinally aligned with said housing flow passage and with said gripping member flow passage.

7. A power wrench as set forth in claim 6 wherein:

(a) said housing includes one end portion having said flow passage therethrough and supporting said elongated shaft and said first gear;

(b) said housing includes an opposite end portion supporting said power means;

(c) first and second handles are mounted on the opposite end portion of said housing and extend therefrom; and (d) one of said handles is rotatably mounted on the opposite end portion of said housing and includes means therein for selectively energizing said drive motor upon turning of said one handle.

* * * * *